United States Patent
Stephens et al.

(10) Patent No.: US 10,881,962 B2
(45) Date of Patent: Jan. 5, 2021

(54) MEDIA-ACTIVITY BINDING AND CONTENT BLOCKING

(71) Applicant: Sony Interactive Entertainment LLC, San Mateo, CA (US)

(72) Inventors: Mischa Stephens, San Mateo, CA (US); Dustin Shawn Clingman, San Mateo, CA (US); Adil Sherwani, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/380,760

(22) Filed: Apr. 10, 2019

(65) Prior Publication Data

US 2020/0188792 A1 Jun. 18, 2020

Related U.S. Application Data

(63) Continuation-in-part of application No. 16/220,460, filed on Dec. 14, 2018.

(51) Int. Cl.
*A63F 13/60* (2014.01)
*A63F 13/69* (2014.01)
(Continued)

(52) U.S. Cl.
CPC .............. *A63F 13/69* (2014.09); *A63F 13/47* (2014.09); *A63F 13/79* (2014.09); *G06F 9/453* (2018.02); *H04N 21/4542* (2013.01)

(58) Field of Classification Search
CPC .......... A63F 13/10; A63F 13/12; A63F 13/32; A63F 13/44; A63F 13/45; A63F 13/47;
(Continued)

(56) References Cited

U.S. PATENT DOCUMENTS 9,168,460 B2 10/2015 Pearce
10,109,003 B1 10/2018 Jenkins et al.
(Continued)

FOREIGN PATENT DOCUMENTS

KR 2018-0094833 8/2018
WO WO 2009/094611 7/2009
(Continued)

OTHER PUBLICATIONS

PCT Application No. PCT/US2019/062626 International Search Report and Written Opinion dated Jan. 29, 2020.
(Continued)

*Primary Examiner* — Omkar A Deodhar
(74) *Attorney, Agent, or Firm* — Polsinelli LLP

(57) ABSTRACT

A system and method for providing a content block is provided. Media and at least one set of activity data associated with the media may be stored in memory. A user request may be received by a server from a user device to stream the media. Such user request may include information about at least one of user completed activities or user in progress activities that a user has engaged with. The media may be monitored to identify a trigger indicating that an activity to be displayed is not one of the at least one of user completed activities or user in progress activities. A notification may be generated to the user that the activity to be displayed is not one of the at least one of user completed activities or user in progress activities.

24 Claims, 5 Drawing Sheets

(51) Int. Cl.
  *H04N 21/454* (2011.01)
  *G06F 9/451* (2018.01)
  *A63F 13/79* (2014.01)
  *A63F 13/47* (2014.01)

(58) Field of Classification Search
  CPC .......... A63F 13/52; A63F 13/55; A63F 13/60;
           A63F 13/69; A63F 13/77; A63F 13/79;
           A63F 2300/535; A63F 2300/538; A63F
             2300/552; A63F 2300/5546; A63F
                 2300/5593; A63F 2300/638
  See application file for complete search history.

(56) References Cited

U.S. PATENT DOCUMENTS

| | | |
|---|---|---|
| 2004/0021684 A1 | 2/2004 | Millner |
| 2009/0170609 A1 | 7/2009 | Kang et al. |
| 2009/0276713 A1 | 11/2009 | Eddy |
| 2010/0070613 A1 | 3/2010 | Chen et al. |
| 2011/0067061 A1 | 3/2011 | Karaoguz et al. |
| 2011/0113149 A1 | 5/2011 | Kaal |
| 2011/0314029 A1 | 12/2011 | Fischer et al. |
| 2011/0319229 A1 | 12/2011 | Corbalis et al. |
| 2012/0004956 A1 | 1/2012 | Huston et al. |
| 2012/0094762 A1 | 4/2012 | Khan |
| 2012/0317198 A1 | 12/2012 | Patton et al. |
| 2013/0064527 A1 | 3/2013 | Maharajh et al. |
| 2013/0086484 A1 | 4/2013 | Antin et al. |
| 2013/0165234 A1 | 6/2013 | Hall et al. |
| 2013/0244785 A1 | 9/2013 | Gary |
| 2014/0199045 A1 | 7/2014 | Lee et al. |
| 2014/0243098 A1 | 8/2014 | Yong et al. |
| 2015/0245084 A1 | 8/2015 | Downing et al. |
| 2015/0296250 A1 | 10/2015 | Casper |
| 2015/0331856 A1 | 11/2015 | Choi et al. |
| 2015/0381689 A1 | 12/2015 | Ganesh et al. |
| 2016/0078471 A1 | 3/2016 | Hamedi |
| 2016/0149956 A1 | 5/2016 | Birnbaum et al. |
| 2016/0350813 A1 | 12/2016 | Balasubramanian et al. |
| 2017/0301041 A1 | 10/2017 | Schneider |
| 2018/0014077 A1* | 1/2018 | Hou ................. H04N 21/25841 |
| 2018/0033250 A1 | 2/2018 | O'Heeron et al. |
| 2018/0101614 A1 | 4/2018 | Kuipers et al. |
| 2018/0318708 A1 | 11/2018 | Rom et al. |
| 2018/0343505 A1 | 11/2018 | Loheide et al. |
| 2019/0208242 A1* | 7/2019 | Bates .................. H04N 21/251 |
| 2019/0246149 A1 | 8/2019 | Reza et al. |
| 2019/0282906 A1 | 9/2019 | Yong |
| 2020/0147489 A1 | 5/2020 | Mahlmeister et al. |
| 2020/0184041 A1 | 6/2020 | Andon et al. |
| 2020/0188781 A1 | 6/2020 | Stephens |
| 2020/0188794 A1 | 6/2020 | Stephens |
| 2020/0188796 A1 | 6/2020 | Stephens |
| 2020/0188800 A1 | 6/2020 | Stephens |
| 2020/0192929 A1 | 6/2020 | Stephens |
| 2020/0193476 A1 | 6/2020 | Stephens |
| 2020/0193477 A1 | 6/2020 | Stephens |

FOREIGN PATENT DOCUMENTS

| | | |
|---|---|---|
| WO | WO 2014/047490 | 3/2014 |
| WO | WO 2017/188677 | 11/2017 |
| WO | WO 2020/123115 | 6/2020 |
| WO | WO 2020/123116 | 6/2020 |
| WO | WO 2020/123117 | 6/2020 |
| WO | WO 2020/123118 | 6/2020 |

OTHER PUBLICATIONS

PCT Application No. PCT/US2019/062606 International Search Report and Written Opinion dated Jan. 30, 2020.
PCT Application No. PCT/US2019/062613 International Search Report and Written Opinion dated Feb. 3, 2020.
U.S. Appl. No. 16/220,460 Office Action dated Jan. 28, 2020.
U.S. Appl. No. 16/220,397, Mischa Stephens, Targeted Gaming News and Content Feeds, filed Dec. 14, 2018.
U.S. Appl. No. 16/359,160, Mischa Stephens, Targeted Gaming News and Content Feeds, filed Mar. 20, 2019.
U.S. Appl. No. 16/220,443, Mischa Stephens, Interactive Objects in Streaming Media and Marketplace Ledgers, filed Dec. 14, 2018.
U.S. Appl. No. 16/379,683, Mischa Stephens, Interactive Objects in Streaming Media and Marketplace Ledgers, filed Apr. 9, 2019.
U.S. Appl. No. 16/220,460, Mischa Stephens, Media-Activity Binding and Content Blocking, filed Dec. 14, 2018.
U.S. Appl. No. 16/220,465, Mischa Stephens, Experience-Based Peer Recommendations, filed Dec. 14, 2018.
U.S. Appl. No. 16/358,546, Mischa Stephens, Experience-Based Peer Recommendations, filed Mar. 19, 2019.
U.S. Appl. No. 16/220,465 Office Action dated Jun. 15, 2020.
U.S. Appl. No. 16/358,546 Office Action dated May 20, 2020.
PCT Application No. PCT/US2019/062602 International Search Report and Written Opinion dated Feb. 14, 2020.
U.S. Appl. No. 16/885,629, Dustin S. Clingman, Media-Object Binding for Displaying Real-Time Play Data for Live-Streaming Media, filed May 28, 2020.
U.S. Appl. No. 16/885,653, Dustin S. Clingman, Media-Object Binding for Predicting Performance in a Media, filed May 28, 2020.
U.S. Appl. No. 16/885,641, Dustin S. Clingman, Media-Object Binding for Dynamic Generation and Displaying of Play Data Associated With Media, filed May 28, 2020.
U.S. Appl. No. 16/220,397 Office Action dated Sep. 25, 2020.
U.S. Appl. No. 16/359,160 Office Action dated Nov. 13, 2020.
U.S. Appl. No. 16/220,443 Office Action dated Oct. 19, 2020.
U.S. Appl. No. 16/379,683 Office Action dated Nov. 16, 2020.

\* cited by examiner

US 10,881,962 B2

MEDIA-ACTIVITY BINDING AND CONTENT BLOCKING

CROSS-REFERENCE TO RELATED APPLICATION

This application is a continuation-in-part of U.S. patent application Ser. No. 16/220,460 filed Dec. 14, 2018, which is incorporated by reference herein in its entirety.

BACKGROUND OF THE INVENTION

1. Field of the Invention

The present technology pertains to streaming media. More specifically, the present technology may provide for media-activity binding and content blocking.

2. Description of the Related Art

Gaming media is an increasingly popular and growing information source for game players. Such gaming media (e.g., from a game publisher or game-related content created by peer players) may incentivize further gameplay, promote new features of a game or a new game, or provide gameplay help. Presently available gaming media typically consist of media streamed to a user (e.g., video streams), which may feature one or more activities with which a user has not interacted or that the user has seen. Typically, a user must either recognize that the activity is an unfamiliar or new one (e.g., a "spoiler") or have researched from another source that the activity shown includes content that the user has not seen.

Due to the popularity of gaming, viewing media content of activities prior to interacting with the activity may detract from the user experience. For example, significant events may occur during such activity that may contribute to a storyline and exposure to such event may expose important aspects of storyline before the user has reached the event. Further, such exposure may dis-incentivize a user from gameplay as the user may feel that they have already seen what will happen later in the game. In another example, users may wish to know more about an activity or object shown in the streaming media. Conventionally, users must perform their own research on such activity or object through various other sources.

There is, therefore, a need in the art for systems and methods for media-activity binding and content blocking.

SUMMARY OF THE PRESENTLY CLAIMED INVENTION

Embodiments of the present invention include systems and methods for providing media-activity binding and content blocking. Media and at least one set of activity data may be stored in memory. Each set of activity data including data about an activity displayed during at least a portion of the media. Each set of activity data may be associated to the media file of the media content title. A user request may be received to stream the media. Such user request may include information about at least one of user completed activities or user in progress activities in which a user has engaged with. The stream of the media may be monitored to identify a trigger indicating that an activity to be displayed is not one of the at least one of user completed activities or user in progress activities. A notification may be generated and transmitted to the user that the activity to be displayed is not one of the at least one of user completed activities or user in progress activities.

Various embodiments may include methods for providing media-activity binding and content blocking. Such methods may include storing media and at least one set of activity data. Each set of activity data may include data about an activity displayed during at least a portion of the media. Such methods may include associating each set of activity data to the media file. Such methods may include receiving a user request to participate in the media. Such user request may including information about at least one of user completed activities or user in progress activities in which a user has engaged. Such methods may include monitoring a stream of the media to identify a trigger indicating that an activity to be displayed is not one of the at least one of user completed activities or user in progress activities. Such methods may include generating a notification to the user that the activity to be displayed is not one of the at least one of user completed activities or user in progress activities.

Additional embodiments may include systems for providing media-activity binding and content blocking. Such systems may include memory that stores media and at least one set of activity data. Each set of activity data may include data about an activity displayed during at least a portion of the media. Such system may include a processor that executes instructions stored in memory. Execution of the instructions by the processor may associate each set of activity data to the media file. Execution of the instructions by the processor may receive a user request to participate in the media. Such user request may include information about at least one of user completed activities or user in progress activities in which a user has engaged. Execution of the instructions by the processor may monitor a stream of the media to identify a trigger indicating that an activity to be displayed is not one of the at least one of user completed activities or user in progress activities. Execution of the instructions by the processor may generate a notification to the user that the activity to be displayed is not one of the at least one of user completed activities or user in progress activities.

Further embodiments include non-transitory computer-readable storage media having embodied thereon a program executable by a processor to provide a method for media-activity binding and content blocking.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Embodiments of the present invention include systems and methods for media-activity binding and content blocking (e.g., spoiler blocking). Media and at least one set of activity data associated with the media may be stored in memory. A user request may be received by a server from a user to stream the media. Such user request may include information about user completed activities or user in progress activities in which a user has engaged with. Such information may be stored in a list of completed activities and in progress activities. The media may be streamed and monitored by the server. A trigger may be received by the server that an activity to be displayed is not one of the user completed activities or user in progress activities. The media may be advanced to a next activity that is one of the user completed activities or user in progress activities or a notification that the activity to be displayed may be a spoiler may be transmitted to the user.

Figure 1:
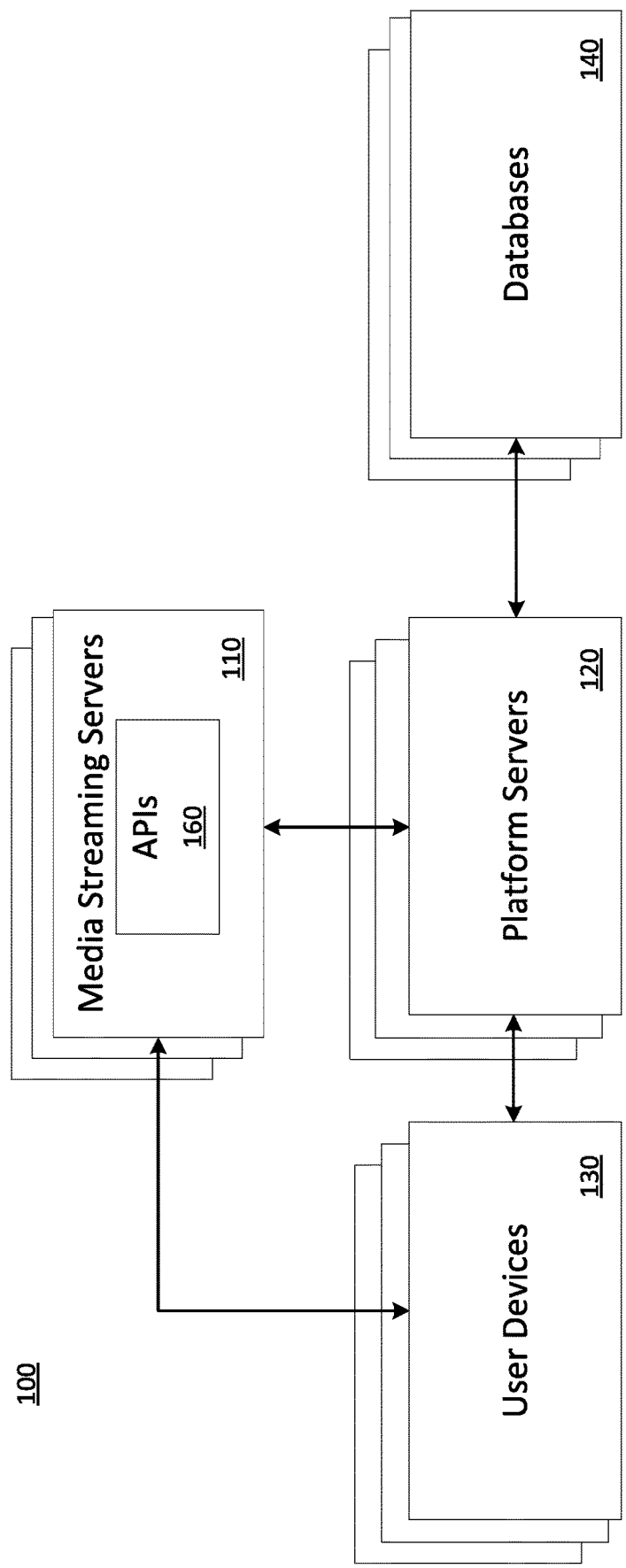
FIG. 1 illustrates an exemplary network environment in which a system for media-activity binding and content blocking may be implemented.

FIG. 1 illustrates an exemplary network environment 100 in which a system for providing media-activity binding and content blocking can occur. The network environment 100 may include one or more media streaming servers 110 that provide streaming content (e.g., interactive video, podcasts, etc.), one or more platform servers 120, one or more user devices 130, and one or more databases 140.

Media streaming servers 110 may maintain, stream, and host interactive media available to stream on a user device 130 over a communication network. Such media streaming servers 110 may be implemented in the cloud (e.g., one or more cloud servers). Each media may include one or more sets of activity data that may be available for participation with (e.g., viewing or interacting with an activity) by a user. Data about the activity shown in the media may be stored by the media streaming servers 110, platform servers 120 and/or the user device 130, in a UDS activity file 216 ("activity file"), as will be discussed in detail with respect to FIGS. 2 and 3.

The platform servers 120 may be responsible for communicating with the different media streaming servers 110, databases 140, and user devices 130. Such platform servers 120 may be implemented on one or more cloud servers. The streaming servers 110 may communicate with multiple platform servers 120, though the media streaming servers 110 may be implemented on one or more platform servers 120. The platform servers 120 may also carry out instructions, for example, receiving a user request from a user to stream media (i.e., games, activities, video, podcasts, User Generated Content, publisher content, etc.). Such user request may include information about a user completed activity and a user in-progress activity. The platform servers 120 may further carry out instructions, for example, for streaming the media content titles. Such media may have at least one activity set associated with the media. Each set of activity data may have data about an activity (e.g., activity information, activity id, activity type, etc.) displayed during at least a portion of the media content. The platform servers 120 may further carry out instructions, for receiving a trigger that an activity to be displayed is not one of the user completed activity or one of the user in progress activity. The platform servers 120 may further carry out instructions, for example, advancing the streaming media to a next activity that is on the list of user activities or for providing a notification that the activity to be displayed may be a spoiler or otherwise unavailable to the user. Such notification may provide the user an option to continue streaming the media showing the spoiler or may provide an option to purchase the unavailable activity.

The media and the associated at least one set of activity data may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of activity data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An exemplary user device 130 is described in detail herein with respect to FIG. 4.

The databases 140 may be stored on the platform server 120, the media streaming servers 110, any of the servers 218 (shown in FIG. 2), on the same server, on different servers, on a single server, across different servers, or on any of the user devices 130. Such databases 140 may store media and an associated set of activity data. Such media may depict one or more activities that a user can participate in and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an activity of an interactive content title (e.g., a video game, interactive book, etc.) and may be "bound" to and stored with the UGC. Such binding enhances UGC as the UGC may deep link (e.g., directly launch) to an activity, may provide for information about an activity and/or a peer of the UGC, and/or may allow a user to interact with the UGC. One or more user profiles may also be stored in the databases 140. Each user profile may include information about the user (e.g., user progress in an activity and/or media content title, user id, user game characters, etc.) and may be associated to media.

Figure 2:
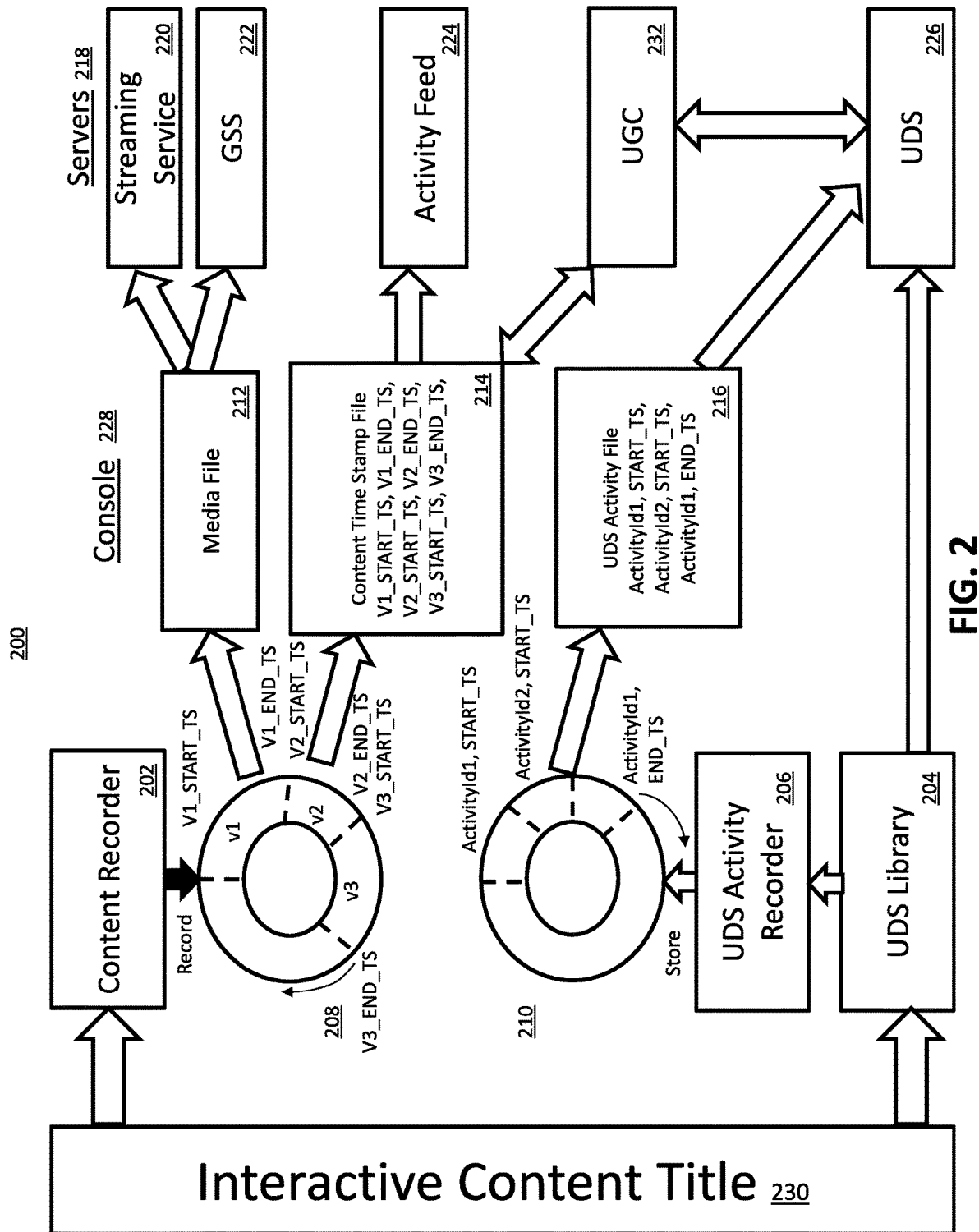
FIG. 2 illustrates a detailed exemplary network in which a system for binding data from a universal data system to user generated content may be implemented.

In the exemplary network environment 200 of FIG. 2, an exemplary console 228 (e.g., a user device 130) and exemplary servers 218 (e.g., streaming server 220, Ghost Solution Suite Server (GSS Server) 222, activity feed server 224, UGC server 232, and Universal Data Systems (UDS) server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 and/or the GSS Server 222 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID or GSS ID, which matches a streaming ID or GSS ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, a UDS library 204 receives data from the interactive content title 230, and a UDS activity recorder 206 tracks the data to determine when an activity beings and ends. The UDS library 204 and the UDS activity recorder 206 may be implemented on the platform server 120, a cloud server, or on any of the servers 218. When the UDS activity recorder 206 detects an activity beginning, the UDS activity recorder 206 receives activity data (e.g., user interaction with the activity, activity ID, activity start times, activity end times, actvity results, activity types, etc.) from the UDS library 204 and records the activity data onto a UDS ring-buffer 210 (e.g., ActivityID1, START_TS; ActivityID2, START_TS; ActivityID3, START_TS). Such activity data recorded onto the UDS ring-buffer 210 may be stored in a UDS activity file 216. Such UDS activity file 216 may also include activity start times, activity end times, an activity ID, activity results, activity types (e.g., competitive match, quest, task, etc.), user or peer data related to the activity. For example, a UDS activity file 216 may store data regarding an item used during the activity. Such UDS activity file 216 may be stored on the UDS server 226, though the UDS activity file 216 may be stored on any server, a cloud server, any console 228, or any user device 130.

Such UDS activity data (e.g., the UDS activity file 216) may be associated with the content data (e.g., the media file 212 and/or the content time stamp file 214). In one example, the UGC server 232 stores and associates the content time stamp file 214 with the UDS activity file 216 based on a match between the streaming ID or GSS ID of the content time stamp file 214 and a corresponding activity ID of the UDS activity file 216. In another example, the UDS server 226 may store the UDS activity file 216 and may receive a query from the UGC server 232 for a UDS activity file 216. Such query may be executed by searching for an activity ID of a UDS activity file 216 that matches a streaming ID or GSS ID of a content time stamp file 214 transmitted with the query. In yet another example, a query of stored content time stamp files 214 may be executed by matching a start time and end time of a content time stamp file 214 with a start time and end time of a corresponding UDS activity file 216 transmitted with the query. Such UDS activity file 216 may also be associated with the matched content time stamp file 214 by the UGC server 232, though the association may be performed by any server, a cloud server, any console 228, or any user device 130. In another example, a UDS activity file 216 and a content time stamp file 214 may be associated by the console 228 during creation of each file 216, 214.

Figure 3:
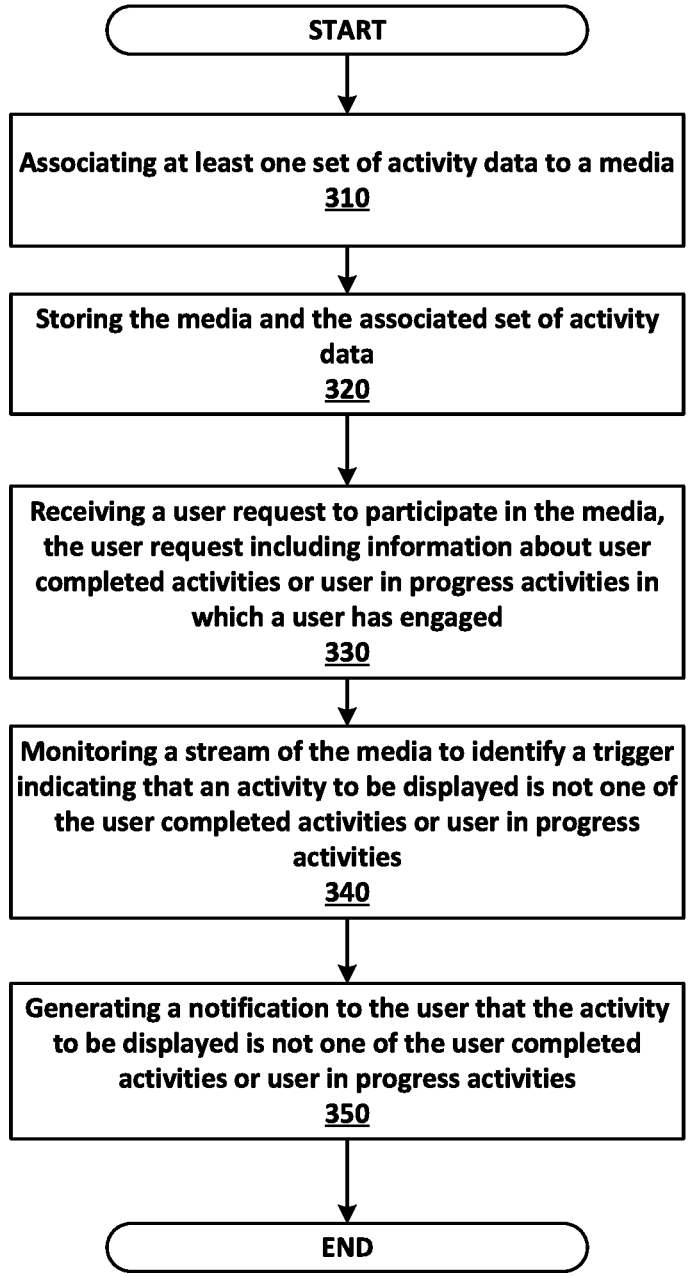
FIG. 3 is a flowchart illustrating an exemplary method for content blocking.

FIG. 3 is a flowchart illustrating an exemplary method 300 for providing media-activity binding and activity blocking. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 3 are performed in the cloud). The steps identified in FIG. 3 (and the order thereof) are exemplary and may include various alternatives, equivalents, or derivations thereof including but not limited to the order of execution of the same.

In step 310, a set of activity data (e.g., at least one activity file 216) is associated to a media (e.g., a media file 212) by the media streaming servers 110 or the platform servers 120. Such association may be based on at least one time stamp of the set of activity data associated with one or more time stamps (e.g., a content time stamp file 214) of the media. Alternatively, such association may be based on an activity ID of the set of activity data associated with a media ID of the media. Each set of activity data may also include data about an activity displayed during at least a portion of the media (e.g., activity results, activity types (e.g., competitive match, quest, task, etc.), user or peer data related to the activity). Each set of activity data may also include a direct link to the associated activity. Such link allows a user to directly access an activity. For example, a user may wish to participate in an activity shown by a media. In the same example, the user can select an option to play the activity shown, and the activity may be automatically launched after selection by the user.

Figure 4A:
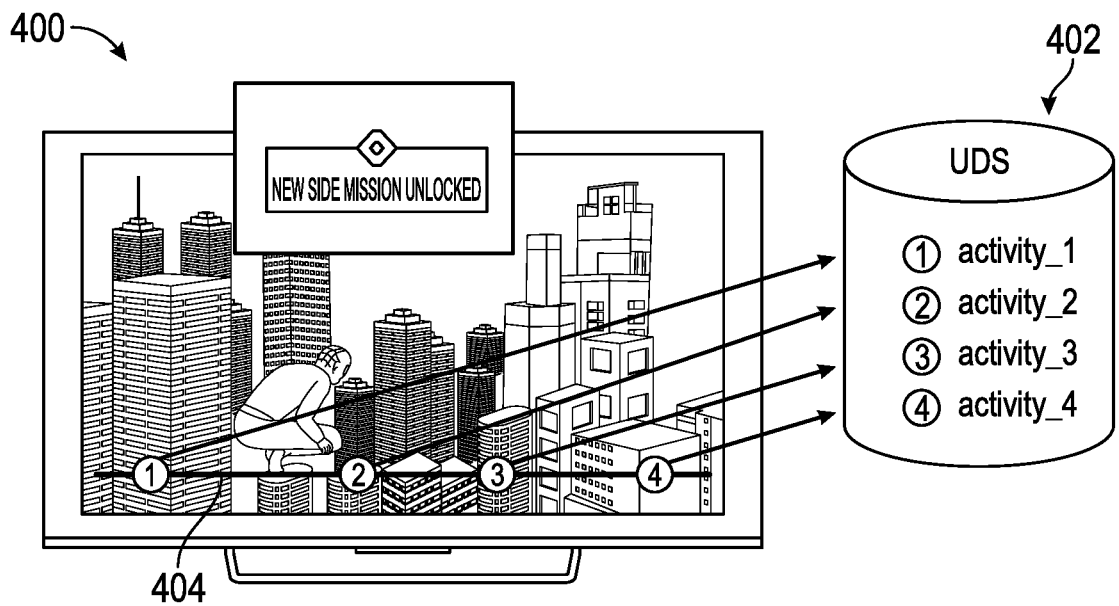
FIG. 4A illustrates at least one set of activity data associated to a timeline of a media.
Figure 4B:
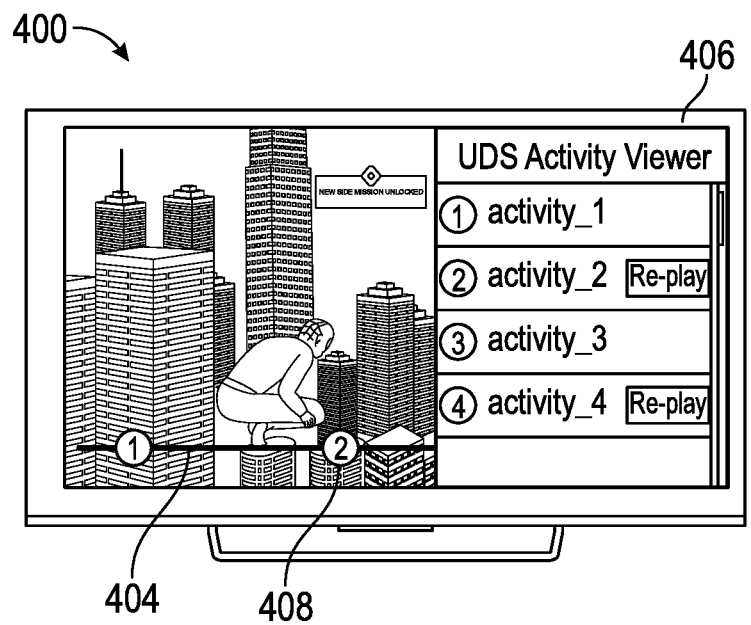
FIG. 4B illustrates an exemplary display of a scene depicting a user or peer gameplay and a corresponding timeline and list of activities.

In an exemplary example, as shown in FIG. 4A, a scene 400 of a media depicting a user or peer gameplay may include at least one set of activity data 402 associated to a timeline 404 having the one or more time stamps. Such association may link an activity start time and/or an activity end time of each set of activity data to an associated time stamp(s) of the timeline 404. Such association may occur as the media is recorded, though such association may occur after the media is recorded. In other words, as the media progresses through the timeline 404 of the one or more time stamps, each time stamp may be associated with one of the sets of activity data 402 such that the data associated with the activity may be made available to the user.

The timeline 404 may allow the user to skip to different time stamps within the timeline 404 to access or launch an activity. In the example shown in FIG. 4B, a list of available activities 406 (e.g., game chapter, activity, side quest, etc.)

is shown in an inset of the media scene 400. The user may select one of the activities shown in the list 406 or may select one of a plurality of numbered points 408 on the timeline 404 associated with each activity shown. Such selection will allow the user to directly "jump" to or launch the selected activity. The set of activity data 402 associated with a resultant time stamp of the user selection may be available to the user. Such selection may save a progress of the current activity and automatically launch the new activity. Such selected activity may be within the same interactive content title of the activity shown or may be within a different interactive content title.

Further, one of the sets of activity data may be associated to UGC. Such association may allow for suggestion of UGC to the user that is related to an activity that the user is participating in. For example, a user may not know how to advance within an activity and a help video associated with the set of activity data at the time stamp of where the user cannot advance (e.g., a user state and/or progress within a game) may be suggested to the user. Such help video can provide tips or a tutorial on how to advance within the activity. In an alternative example, the UGC may be identified by matching key words or metadata between a help video and a set of activity data of the activity that the user is participating in.

Returning to FIG. 3, in step 320, the media and the at least one set of activity data are stored in the database 140 or the user devices 130 by the media streaming servers 110 or the platform servers 120. The media may be part of an interactive content title 230 or may be UGC (e.g., help video, screen shots, videos, commentary, mashups, etc.) generated by the user, peers, a publisher of the media content title, or a third party. One or more user profiles may also be stored in the database 140 or the user devices 130 by the media streaming servers 110 or the platform servers 120.

In step 330, a user request is received from a user by the platform server 120 or the media streaming servers 110 to participate (e.g., view or interact with an activity) in the media. Such user request may be received from a user device 130. Such user request may include information about user completed activities or user in progress activities that a user has participated in. Such information may be stored in a user profile associated with the user, though such user profile may also be associated with the media and retrieved when the user request is received. Each user in progress activity may include a flag indicating where a user has stopped interaction within each activity. For example, a user may have completed 25% of an activity and a corresponding flag indicating 25% completion may be stored with the activity. Each user in progress activity and user completed activity may also include activity start times, activity end times, an activity ID, activity results, activity types (e.g., competitive match, quest, task, etc.), user or peer data related to the activity.

In step 340, a stream of the media is monitored by the media streaming servers 110 or the platform servers 120 and a trigger may be identified. Such trigger may indicate that an activity to be displayed is not one of the user completed activities or the user in progress activities. Such activity may not be one of the user completed activities or the user in progress activities because the user has either not participated in the activity or does not have access to the activity (e.g., does not own the activity, does not have enough skill and/or experience to access the activity, etc.). Identifying such trigger may include retrieving an activity id from one of the sets of activity data associated with an activity prior to the media content title streaming the activity by the platform server 120 or the media streaming server 110. Identifying such trigger may also include comparing the activity id to an activity id of each user completed activities or each user in progress activities. A trigger may be generated when the retrieved activity id does not match any activity id of the user completed activities or the user in progress activities. In other words, the trigger alerts or notifies the platform server 120 or the media streaming server 110 that the media that is about to be streamed may include content that the user has not yet been exposed to and may "spoil" the corresponding activity that the user has not participated in yet or has not progressed far enough. The trigger may also alert or notify the platform server 120 or the media streaming server 110 that the media that is about to be streamed may include content that the user does not have access to (e.g., the user does not own the activity, the user does not have enough progress or skill to access the activity, etc.)

In step 350, a notification may be generated and transmitted to the user that the activity to be displayed is not one of the user completed activities or the user in progress activities (e.g., a spoiler warning) by the media streaming servers 110 or the platform servers 120. The notification to the user may provide the user an option to skip the activity to be displayed, play the activity to be displayed, or block the activity to be displayed. A selection of skipping the activity to be displayed may advance the streaming media to the next activity that is one of the user completed activities or the user in progress activities. A selection of blocking the activity to be displayed may advance the streaming media to the next activity that is one of the user completed activities or the user in progress activities and block future activities associated with the blocked activity. Such notification may include an option to purchase the activity if the activity is not accessible to the user.

Systems and methods for media-activity binding and activity blocking may enhance a user experience by allowing a user to participate and jump between different activities shown in a media content title and view UGC relevant to the activity and by blocking access to activities that may include content that the user has not yet been exposed to or otherwise does not have access to. Providing information immediately about an activity may incentivize users to continue or begin gameplay with a media content title. Further, activity blocking while participating in the media content title may prevent a user from becoming discouraged by viewing an activity that the user has not yet been exposed to or incentivize a user to gain access to the activity.

Figure 5:
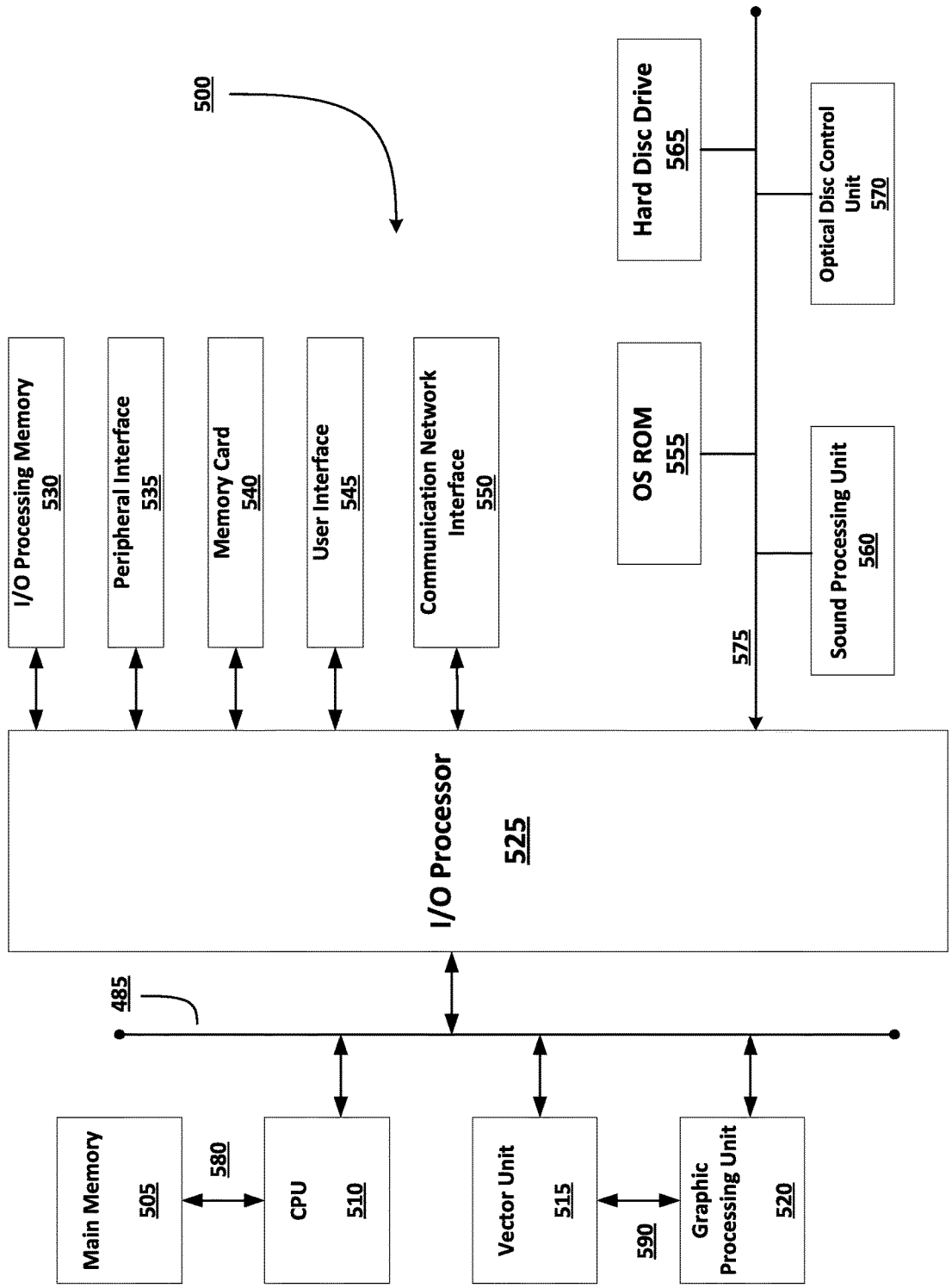
FIG. 5 is an exemplary electronic entertainment system that may be used in providing media-activity binding and content blocking.

FIG. 5 is an exemplary user electronic entertainment system that may be used in launching interactive content and providing dynamic interfaces. The entertainment system 500 of FIG. 5 includes a main memory 505, a central processing unit (CPU) 510, vector unit 515, a graphics processing unit 520, an input/output (I/O) processor 525, an I/O processor memory 530, a peripheral interface 535, a memory card 540, a Universal Serial Bus (USB) interface 545, and a communication network interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4G, LTE, 1G, and so forth). The I/O processor 525 of FIG. 5 primarily controls data exchanges between the various devices of the entertainment system 500 including the CPU 510, the vector unit 515, the graphics processing unit 520, and the peripheral interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the communication network interface 550 such as wireless transceivers, which may also be embedded in the system 500 or as a part of some other component such as a processor.

A user of the entertainment system 500 of FIG. 5 provides instructions via the peripheral interface 535 to the CPU 510, which allows for use of a variety of different available peripheral devices (e.g., controllers) known in the art. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of providing a content block, the method comprising:
    associating one or more sets of activity data to a media file;
    storing the one or more sets of activity data associated with the media file, each set of activity data including data about an associated activity displayed during at least a portion of the media file;
    receiving information, based on a user request, about activities in which a user has engaged, wherein the activities are associated with one or more corresponding activity identifiers;
    identifying a trigger indicating that an upcoming activity yet to be displayed is not one of the activities, wherein identifying the trigger comprises:
        retrieving an activity identifier from the one or more sets of activity data associated with the associated activity prior to the display of the associated activity; and
        comparing the retrieved activity identifier to each activity identifier of the one or more corresponding activity identifiers, wherein the trigger is identified when the retrieved activity identifier does not make any activity identifier of the one or more corresponding activity identifiers; and
    generating a notification to the user that the upcoming activity is not one of the activities.

2. The method of claim 1, wherein the media file is a help video relevant to a user interaction with an activity engaged in by the user within an interactive content title, and wherein the help video is suggested to the user based on a set of activity data of the activity engaged in by the user.

3. The method of claim 1, further comprising:
    displaying a list of activities corresponding to the one or more sets of activity data associated with the media file;
    receiving a selection of one of the set activities corresponding to one of the one or more sets of activity data; and
    launching the selected activity associated with the corresponding set of activity data.

4. The method of claim 1, wherein the user request is received from a user device.

5. The method of claim 1, wherein the media file is user-generated content suggested to the user based on the activities of the user.

6. The method of claim 1, wherein each set of activity data further includes a direct link to the associated activity.

7. The method of claim 6, further comprising:
receiving a selection by the user of the associated activity shown in the media file, and
directly launching the associated activity within an interactive content title based on the direct link to the associated activity.

8. The method of claim 1, wherein each of the activities is associated with a corresponding activity identifier within a corresponding set of activity data of the media file.

9. The method of claim 1, wherein each set of activity data further includes at least one of an activity start time, an activity end time, an activity result, an activity type, user data, or peer data.

10. The method of claim 1, further comprising storing a user profile associated with the media file, the user profile including the information about the activities, and further comprising retrieving the user profile associated with the media file in response to the user request.

11. The method of claim 1, wherein the notification includes at least one of an option to skip, play, or block the upcoming activity.

12. A system for providing a content block, the system comprising:
memory that stores one or more sets of activity data associated with a media file, each set of activity data including data about an associated activity displayed during at least a portion of the media file; and
one or more processors that executes instructions stored in the memory, wherein execution of the instructions by the one or more processors:
associates each set of activity data to the media file;
receives information, based on a user request, about activities in which a user has engaged, wherein the activities are associated with one or more corresponding activity identifiers;
identifies a trigger indicating that an upcoming activity yet to be displayed is not one of the activities, wherein identifying the trigger comprises:
retrieving an activity identifier from the one or more sets of activity data associated with the associated activity prior to the display of the associated activity; and
comparing the retrieved activity identifier to each activity identifier of the one or more corresponding activity identifiers, wherein the trigger is identified when the retrieved activity identifier does not make any activity identifier of the one or more corresponding activity identifiers; and
generates a notification to the user that the upcoming activity is not one of the activities.

13. The system of claim 12, wherein the media file is a help video relevant to a user interaction with an activity engaged in by the user within an interactive content title, and wherein the help video is suggested to the user based on a set of activity data of the activity engaged in by the user.

14. The system of claim 13, wherein the help video is generated by a peer.

15. The system of claim 13, further comprising a communication interface that communicates over a communication network with a user device that sends the user request.

16. The system of claim 12, wherein the media file is user-generated content suggested to the user based on the information about the activities.

17. The system of claim 12, wherein each set of activity data further includes a direct link to the associated activity.

18. The system of claim 17, further comprising a user interface that receives a selection by the user of the associated activity shown in the media file and wherein the one or more processors executes further instructions to directly launch the associated activity within an interactive content title based on the direct link to the associated activity.

19. The system of claim 12, wherein each of the activities is associated with a corresponding activity identifier within a corresponding set of activity data of the media file.

20. The system of claim 12, wherein each set of activity data further includes at least one of an activity start time, an activity end time, an activity result, an activity type, user data, or peer data.

21. A non-transitory computer-readable medium having embodied thereon a program executable by one or more processors to perform a method for providing a content block, the method comprising:
associating one or more sets of activity data to a media file;
storing the one or more sets of activity data associated with the media file, each set of activity data including data about an associated activity displayed during at least a portion of the media file;
receiving information, based on a user request, about activities in which a user has engaged, wherein the activities are associated with one or more corresponding activity identifiers;
identifying a trigger indicating that an upcoming activity yet to be displayed is not one of the activities, wherein identifying the trigger comprises:
retrieving an activity identifier from the one or more sets of activity data associated with the associated activity prior to the display of the associated activity; and
comparing the retrieved activity identifier to each activity identifier of the one or more corresponding activity identifiers, wherein the trigger is identified when the retrieved activity identifier does not make any activity identifier of the one or more corresponding activity identifiers; and
generating a notification to the user that the upcoming activity is not one of the activities.

22. The method of claim 1, wherein the activities are at least one of completed activities or in-progress activities.

23. The system of claim 12, wherein the activities are at least one of completed activities or in-progress activities.

24. The non-transitory computer-readable medium of claim 21, wherein the activities are at least one of completed activities or in-progress activities.

* * * * *